May 29, 1934.  G. H. MEEKER  1,960,274
NUT LOCK
Filed May 6, 1933
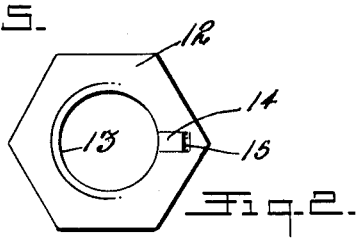
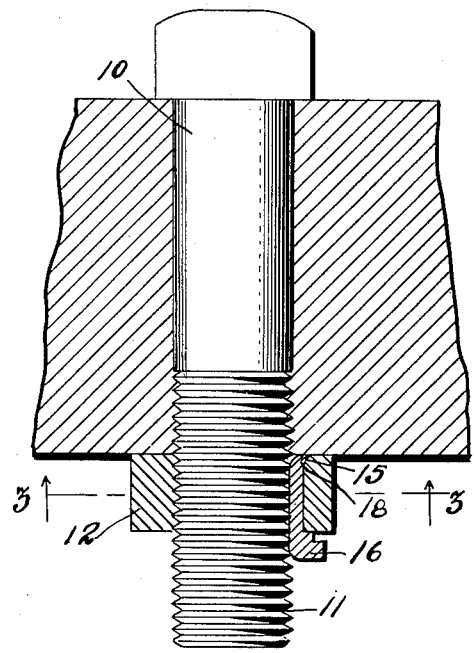
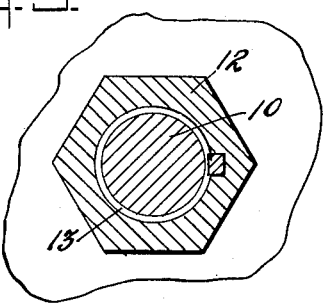
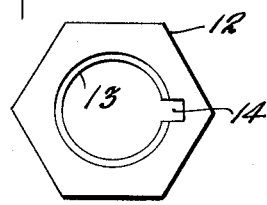
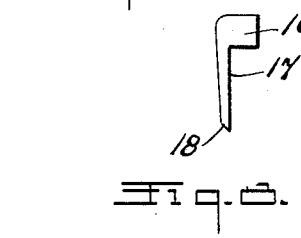
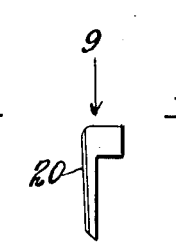
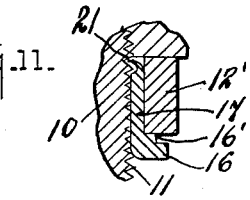
WITNESSES:
INVENTOR
George H. Meeker
BY
Joshua R. H. Potts
HIS ATTORNEY Patented May 29, 1934

1,960,274

UNITED STATES PATENT OFFICE 1,960,274

NUT LOCK

George H. Meeker, Philadelphia, Pa.

Application May 6, 1933, Serial No. 669,709

1 Claim. (Cl. 151—23)

This invention relates to nut locks and has for an object to provide improved means for locking a nut relative to a threaded bolt.

A further object of the invention is to provide a nut having a groove extending parallel with the axis of its threaded bore, said groove being tapered outwardly at one side of the nut, with a key properly proportioned to be inserted into the groove and to have its point turned into the taper of the groove and to bite into the thread of the bolt.

A further object of the invention is to provide a nut properly threaded to coact with the bolt, said nut having a groove formed as an offset from the threaded bore of the nut and at one end flaring outwardly, together with a key properly proportioned to be driven into the groove and to mutilate the threads of the bolt in such driving, and to have the inner end of the key clenched into the tapered offset from the groove.

A further object of the invention is to provide in combination with a threaded bolt a nut having a threaded bore therethrough for cooperation with the bolt, and with a groove extending parallel with the axis of the bore throughout the extent of the nut, and with the groove at one end tapered by enlargement away from the bore, and a key properly proportioned to be driven into the bore to mutilate the edges of the thread of the bore and to be clenched into the offset part of the groove, and a head bearing upon the top of the nut limiting the extent to which it may be driven.

The invention, therefore, comprises, in combination with a bolt having a threaded part, of a nut tapped to cooperate with the threaded part of the bolt, with a groove offset radially from the tapped opening and extending parallel with the axis of said opening, in one form, the end of the groove at one face of the nut being tapered outwardly away from the bore, together with a key having a head of greater extent than the groove, and a length approximately equal to the thickness of the nut, with an end so formed that when the key is driven into the groove it will slightly mutilate the extreme edges of the thread of the bolt and the end of the key find a seat in the tapered offset of the groove, and in another embodiment, the key having a resilient finger engaging the thread of the bolt.

The drawing illustrates several embodiments of the invention and the views therein are as follows:

Figure 1 is a view in elevation of a bolt showing a nut provided with the improved lock shown in diametrical section, Figure 2 is a view of the bolt and nut in end elevation, as indicated by arrow 2 at Figure 1, Figure 3 is a sectional view through the nut, bolt and key, as indicated by line 3—3 of Figure 1, Figure 4 is a view of the nut removed from the bolt, seen from the side opposite the work, Figure 5 is a plan view of the nut removed from the bolt, seen from the side which normally engages the work, Figure 6 is a view in side elevation of one form of key, Figure 7 is a view in side elevation of a modified type of key, Figure 8 is a view in side elevation of a further modification of the key, Figure 9 is a view in end elevation of the key shown and indicated by arrow 9 at Figure 8, Figure 10 is one elevation of a modified type of key, and Figure 11 is a sectional view of a further modification.

Like characters of reference indicate corresponding parts throughout the several views.

The bolt 10 may be of any type of bolt ordinarily employed, with a threaded part 11. A nut 12 is employed, tapped at 13, with a thread for cooperation with the thread 11. Along one side of the tapped opening a groove 14 is formed. This groove 14 may be formed coincidentally with the nut by the use of a die with the proper contour.

In one type the groove will have an offset part 15 which forms a taper at one end of the groove, that is to say, the groove is enlarged at one side of the nut by the slightly tapered section. This is shown more particularly at Figures 1 and 5.

For cooperation with said nut and bolt, as thus described, a key is employed which is driven into the groove 14. At Figures 6, 7, 8 and 10, slightly modified types of keys are shown.

As shown at Figure 10, the key is provided with a head 16 and limiting shoulder 16' and slightly tapered body part 17 with an abruptly tapered extremity 18.

This is the type shown at Figure 1 in position, and when it is driven into the groove 14 of the nut, the abruptly tapered extremity 18 will engage the work and clench the extremity into the offset taper 15.

The body 17 is so proportioned that as it is driven into the groove 14, it will make sufficient engagement with the extreme edges of the threads 11 as to slightly mutilate these threads, and thus prevent rotation of the nut relative thereto until the key has been withdrawn, which may be done by inserting an implement under the head 16.

It is the intent that the threads shall be so slightly mutilated as to offer but little resistance to the removal and return of the nut 12, in the usual manner, after the withdrawal of the key, and that it may be again fixed in position by the insertion of the same or another key.

At Figure 7 the key is designed to be composed of resilient material so that the point 19 will resiliently yield sufficiently to permit the key to be driven, as above described, and when so driven, the turn point 19, as shown at Figure 7, will occupy the same position as the clenched point 18, shown at Figure 1.

At Figures 8 and 9 the key is shown with a rib 20 which will cut a groove through the extreme edges of the threads 11. In all other respects the key shown at Figures 8 and 9 are as shown at Figures 6 and 7, and may be either of the clenching type or the resilient type.

At Figure 11 a slightly different modification is shown. The head 16, shoulder 16' and body 17 of the key are identical with the types previously discussed, with the exception of Figures 8 and 9. It is, however, contemplated that this key shall be made of resilient material and have a point 21 which will yield sufficiently so that when it is driven in it will snap past the threads, but will engage under the ultimate thread to prevent the accidental displacement of the key.

The body 17 will mutilate the threads 11 in exactly the same manner as heretofore described, so that the nut 12' cannot turn and the spring point 21 will prevent the accidental displacement of the key. Of course, this key may also be withdrawn by the application of an implement under the head 16, whereupon the point will again snap past the several threads in being withdrawn.

In all of the several modifications shown, the engaging end of the key is wholly enclosed within the nut, and is not, therefore, exposed to the elements, and, therefore, less subject to corrosion than keys having locking parts which are exposed to the weather.

Also, although the threads are mutilated, they are mutilated to such a minor degree that when the key is removed and the nut removed, the threads have been re-shaped to approximate their original form.

It is quite obvious that these keys may be driven at any point where the seating of the nut may place the groove and that when the nut is replaced after having been removed, the key is likely to be positioned differently, relative to the circumference of the bolt, so that when the key or another key is again driven in, a different part of the thread of the bolt will be mutilated.

Of course, the nut lock herein illustrated may be modified and changed in various ways without departing from the invention herein set forth and hereafter claimed.

The invention is hereby claimed as follows:

The combination of a bolt having an uninterrupted thread, a nut having a complementarily threaded bore and with a groove offset from and extending parallel with the axis of the bore, said groove being radially increased in depth adjacent to the work engaging face but stopping short of the perimeter of the nut to form a confined recess, and a key slightly longer than the thickness of the nut and properly proportioned for driving into the groove to mutilate the threads of the bolt and force the inserted end of the key, by contact with the work, to be diverted to substantially fill the groove and the recess.

GEORGE H. MEEKER.